United States Patent
Tseng

(10) Patent No.: US 7,414,603 B2
(45) Date of Patent: Aug. 19, 2008

(54) LIQUID CRYSTAL DISPLAY PANEL TURNING DEVICE

(75) Inventor: Chiang-Hung Tseng, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 814 days.

(21) Appl. No.: 10/997,131

(22) Filed: Nov. 24, 2004

(65) Prior Publication Data

US 2005/0134759 A1 Jun. 23, 2005

(30) Foreign Application Priority Data

Dec. 20, 2003 (CN) ............ 2003 1 0117596

(51) Int. Cl.
*G09G 3/36* (2006.01)

(52) U.S. Cl. ............ 345/87; 361/681; 248/917

(58) Field of Classification Search ............ 345/87, 345/905; 248/271, 917–924; 361/681–683; 349/58

See application file for complete search history.

(56) References Cited

U.S. PATENT DOCUMENTS 5,628,660 A * 5/1997 Onitsuka ............ 445/24
6,826,963 B2 * 12/2004 Liu et al. ............ 73/798
2001/0032542 A1 * 10/2001 Heikkila ............ 91/508
2001/0055197 A1 * 12/2001 Agata et al. ............ 361/683
2002/0139413 A1 * 10/2002 Sasaki ............ 136/246
2004/0065155 A1 * 4/2004 Liu et al. ............ 73/798
2005/0146845 A1 * 7/2005 Moscovitch ............ 361/681

* cited by examiner

*Primary Examiner*—Nitin Patel
(74) *Attorney, Agent, or Firm*—Wei Te Chung

(57) ABSTRACT

An LCD panel turning device (100) includes a panel turning unit (30), a lift unit (40), and a shifting unit (50). The panel turning unit has two opposite panel holding faces, and can turn about a central axis thereof. The lift unit connects with the panel turning unit, and can raise or lower the panel turning unit. The shifting unit connects with the lift unit, and can move the lift unit and the panel turning unit back and forth along a linear path in unison. When the LCD panel turning device is used in an LCD panel repair system, placing and removing of each LCD panel on and from the repair unit is accomplished by means of only the single panel turning unit. Thus the space taken up by the LCD panel turning device is relatively little.

17 Claims, 4 Drawing Sheets

US 7,414,603 B2

LIQUID CRYSTAL DISPLAY PANEL TURNING DEVICE

BACKGROUND OF THE INVENTION

1. Field of the Invention

The present invention relates to industrial robots for manipulating liquid crystal display (LCD) panels, and especially to an LCD panel turning device used for an LCD panel repair system.

2. Description of Prior Art

An LCD panel is an important component of an LCD device. The cost of the LCD panel is higher than that of other components of the LCD device, such as a light guide plate, a frame or a light source. When a mass produced LCD panel is found to be defective, it is usually diverted for repair work in order to remedy the defects.

The LCD panel must be turned upside down, because the repair work can only be done from the back face of the LCD panel. To automatically turn over the LCD panel, an LCD panel turning device is used.

Referring to FIG. 6, a conventional LCD panel repair system 1 with a turning device is shown. The LCD panel repair system 1 comprises a loading unit 11, a first turning unit 12, a first transfer unit 13, a repair unit 14, a second transfer unit 15, a second turning unit 16, and an unloading unit 17. The above units are arranged side by side in the above sequence. The first turning unit 12 and the second turning unit 16 constitute the turning device of the LCD panel repair system 1.

The loading unit 11 is used to load an LCD panel (not shown) on the first turning unit 12 such that the front face of the LCD panel faces upwardly. Then the first turning unit 12 turns over the LCD panel, so that the back face of the LCD panel faces upwardly. The first transfer unit 13 transfers the inverted LCD panel to the repair unit 14. In the repair unit 14, the repair work on the LCD panel is performed. After the repair work is finished, the LCD panel is transferred to the second turning unit 16 by the second transfer unit 15. On the second turning unit 16, the LCD panel is turned over again. Finally, the unloading unit 17 unloads the LCD panel to a storage device (not shown), thereby completing the repair work of the LCD panel.

The LCD panel is processed along a linear path of the repair system 1, so that the repair system 1 can maintain a continuous run of successive LCD panels. However, this makes the repair system 1 unduly large. Each side of the repair unit 14 has the turning unit 12 or 14 and the transfer unit 13 or 15, in addition to the loading unit 11 and the unloading unit 17.

Thus, a new LCD panel turning device that overcomes the above-mentioned space disadvantages is desired.

SUMMARY OF THE INVENTION

An object of the present invention is to provide an LCD panel turning device that takes up relatively little space.

In order to achieve the object set out above, an LCD panel turning device in accordance with the present invention comprises a panel turning unit, a lift unit and a shifting unit. The panel turning unit has two opposite panel holding faces, and can turn about a central axis thereof. The lift unit connects with the panel turning unit, and can raise or lower the panel turning unit. The shifting unit connects with the lift unit, and can move the lift unit and the panel turning unit back and forth along a linear path in unison.

Because the panel turning unit has the two opposite faces, the LCD panel turning device can load and unload LCD panels by means of the single panel turning unit. When the LCD panel turning device is used in an LCD panel repair system, placing and removing of each LCD panel on and from the repair unit is accomplished by means of only the single panel turning unit. Thus the space taken up by the LCD panel turning device is less than that of comparable prior art.

Other objects, advantages, and novel features of the present invention will become more apparent from the following detailed description when taken in conjunction with the accompanying drawings, in which:

DETAILED DESCRIPTION OF THE INVENTION

Reference will now be made to the drawings to describe the present invention in detail.

Figure 1:
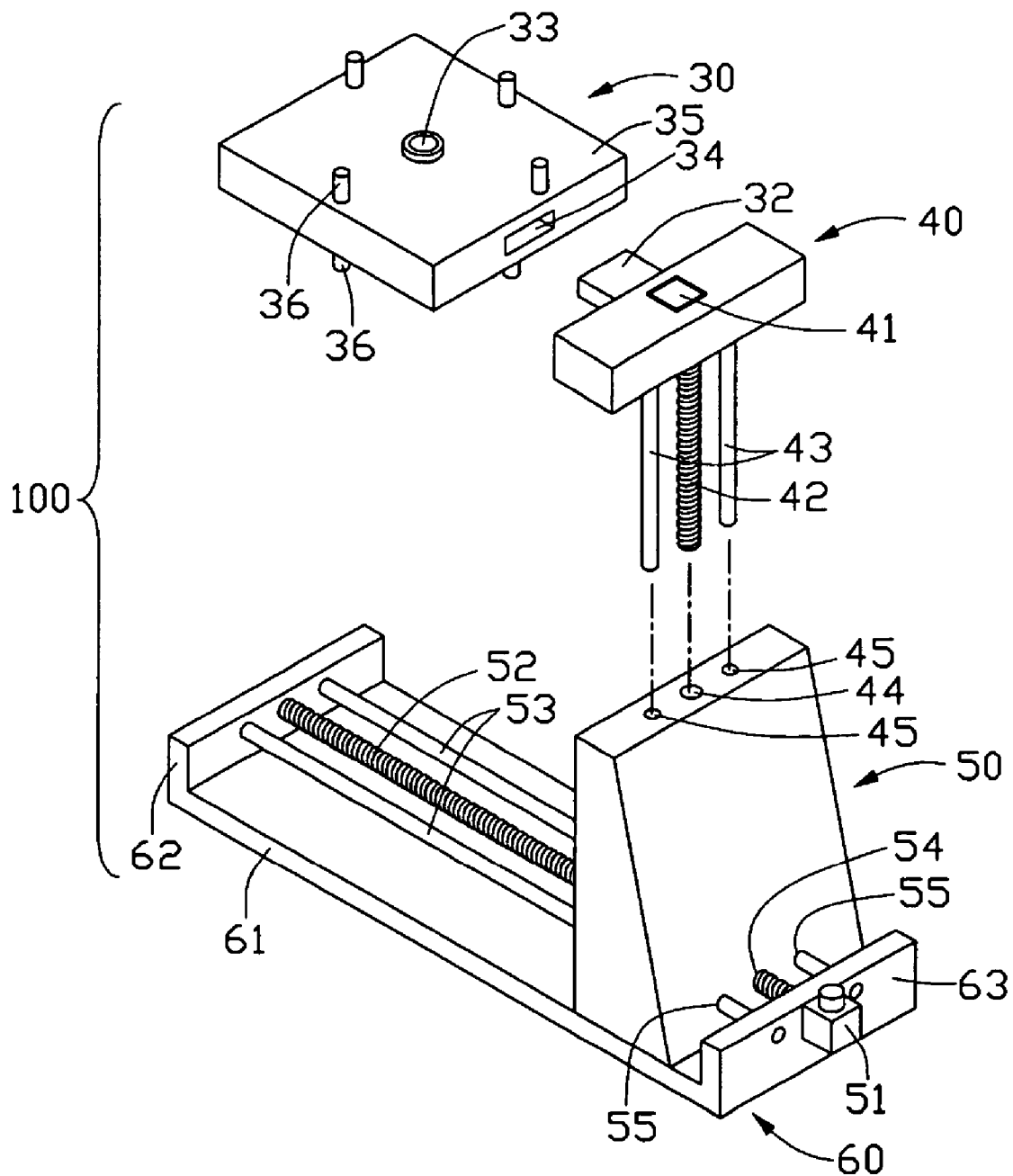
FIG. 1 is an exploded, isometric view of an LCD panel turning device according to the present invention.
Figure 2:
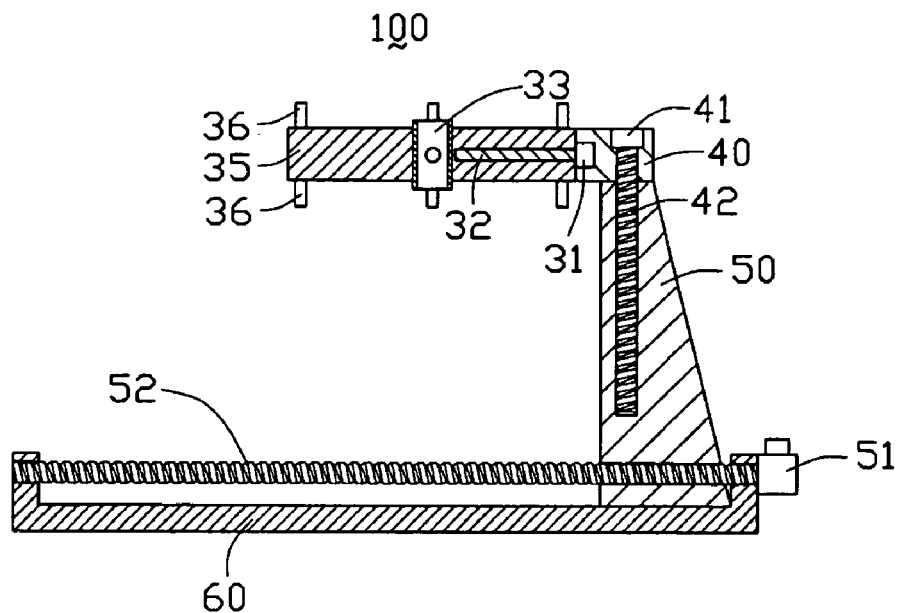
FIG. 2 is a cutaway view of the LCD panel turning device of FIG. 1 fully assembled.

Referring to FIG. 1 and FIG. 2, an LCD panel turning device 100 in accordance with the present invention comprises a panel turning unit 30, a lift unit 40, a shifting unit 50, and a base 60.

The panel turning unit 30 comprises an alignment part 35 and a first driving motor 31. The alignment part 35 has two opposite panel holding faces (not labeled), and an engaging hole 34 midway between the panel holding faces. Each panel holding face of the alignment part 35 has a suction cup 33 and four positioning pins 36 provided thereon. The suction cup 33 is set on a center of the holding face to hold an LCD panel (not shown) by vacuum adsorption. The four positioning pins 36 are set at four sides of the panel holding face respectively. Each positioning pin 36 can align one side of the LCD panel, so that the LCD panel can be accurately held in position. The first driving motor 31 connects with an engaging plate 32, and the engaging plate 32 is engaged in the engaging hole 34. The first driving motor 31 can thus drive the alignment part 35 to turn about a central axis of the alignment part 35.

The lift unit 40 comprises a second driving motor 41, a first worm screw 42 connecting with the second driving motor 41, and two first guide rods 43. The shifting unit 50 defines a first screw hole 44 and two first guide holes 45. The first screw hole 44 receives the first worm screw 42 therethrough, and the first guide holes 45 receive the two first guide rods 43 therethrough. When the second driving motor 41 drives the first worm screw 42 to rotate, the lift unit 40 is raised or lowered by reason of the engagement of the first worm screw 42 in the first screw hole 44. The engagement of the first guide rods 43 in the first guide holes 45 can enhance the stability and strength of the lift unit 40.

The shifting unit 50 further comprises a third driving motor 51, a second worm screw 52 connecting with the third driving motor 51, a second screw hole 54, two second guide rods 53, and two second guide holes 55. The second screw hole 54 receives the second worm screw 52 therethrough, and the second guide holes 55 receive the second guide rods 53 therethrough. When the third driving motor 51 drives the second worm screw 52 to rotate, the shifting unit 50 moves back and forth along a linear path, by reason of the engagement of the second worm screw 52 in the second screw hole 54. The engagement of the second guide rods 53 in the second guide holes 55 can enhance the stability and strength of the shifting unit 50.

The base 60 comprises a bottom plate 61 and two opposite side plates 62 and 63. The third driving motor 51 is fixed on the side plate 63. The second guide rods 53 are fixed on the side plates 62 and 63.

The first driving motor 31 is fixed in the lift unit 40, so that the lift unit 40 connects with the panel turning unit 30. In addition, because the lift unit 40 connects with the shifting unit 50, the shifting unit 50 can move the lift unit 40 and the panel turning unit 30 back and forth along the linear path in unison.

In assembly, the panel turning unit 30 is connected with the lift unit 40, by way of the first driving motor 31 being fixed in the lift unit 40. The lift unit 40 is connected with the shifting unit 50 by way of the engagement of the first worm screw 42 in the first screw hole 44. The shifting unit 50 is set on the base 60.

Figure 3:
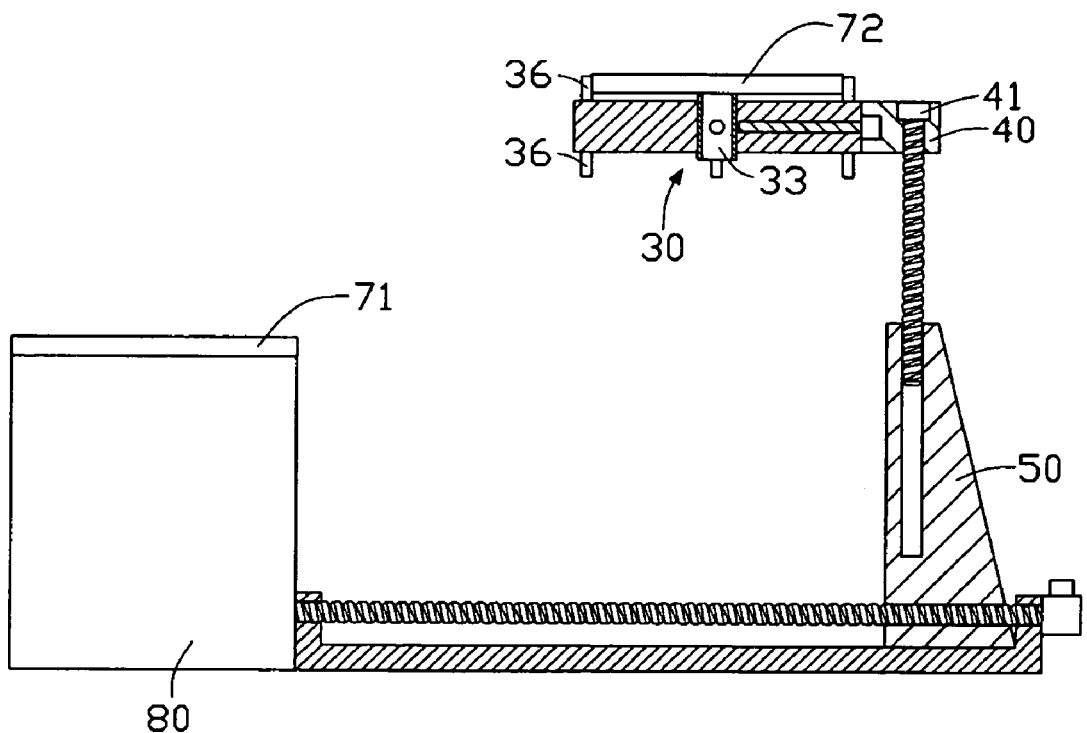
FIGS. 3 to 5 are cutaway views of the LCD panel turning device of FIG. 1 fully assembled together with a repair unit and two LCD panels, showing different stages in operation of the LCD panel turning device.

Operation of the LCD panel turning device 100 will be described below with reference to FIGS. 3 through 5. In operation, the start of a repair cycle is defined as when an LCD panel 71 is first placed on a repair unit 80, and the end of the repair cycle is defined as when another LCD panel 72 is first placed on the repair unit 80. The start of a cycle of handling the LCD panel 71 is defined as when the LCD panel 71 is first loaded on the panel turning unit 30, and the end of the cycle of handling the LCD panel 71 is defined as when the LCD panel 71 is unloaded from the panel turning unit 30.

Firstly, the LCD panel 71 is loaded on the panel turning unit 30. The shifting unit 50 moves the lift unit 40 and the panel turning unit 30 to a space above the repair unit 80. Then the lift unit 40 is lowered, and the LCD panel 71 is placed on the repair unit 80. Referring to FIG. 3, while the LCD panel 71 is undergoing repair on the repair unit 80, the lift unit 40 is raised and the LCD panel 72 is loaded on the panel turning unit 30.

Figure 4:
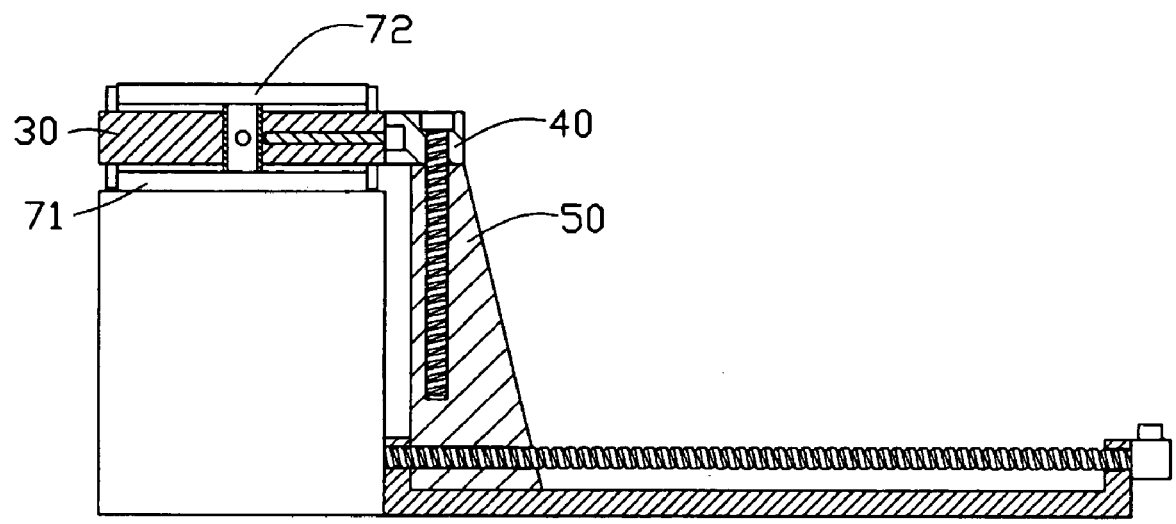

Secondly, referring to FIG. 4, when the repair of the LCD panel 71 is finished, the shifting unit 50 moves the lift unit 40 and the panel turning unit 30 to the space above the repair unit 80. Then the lift unit 40 is lowered, and the panel turning unit 30 contacts and holds the LCD panel 71.

Figure 5:
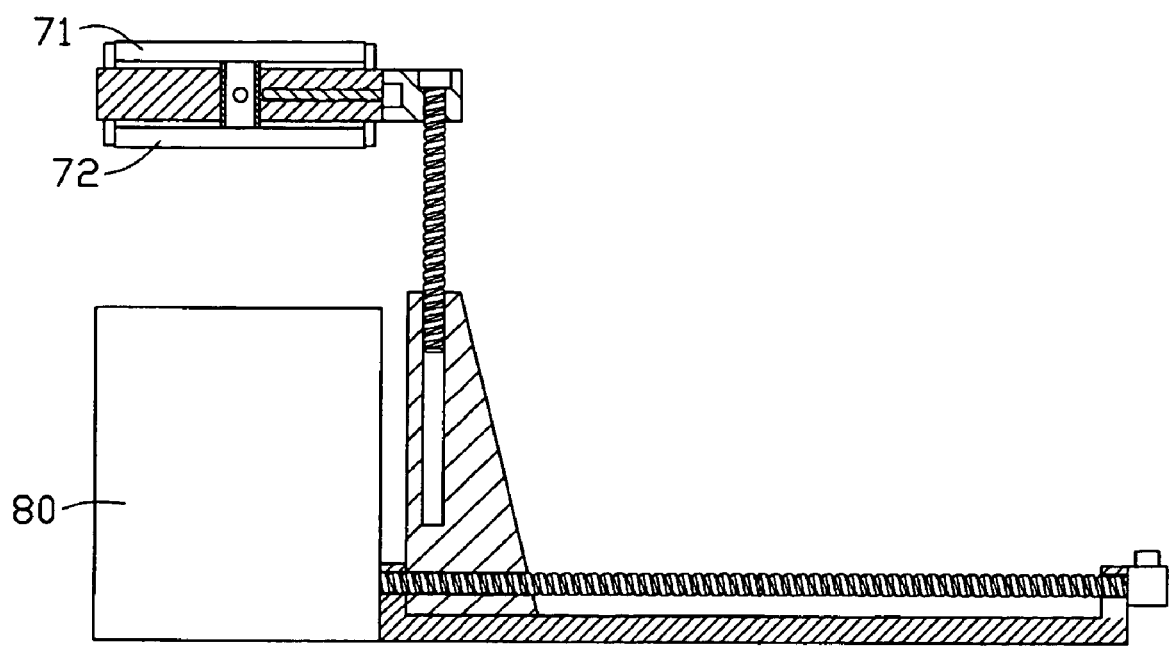
Figure 6:
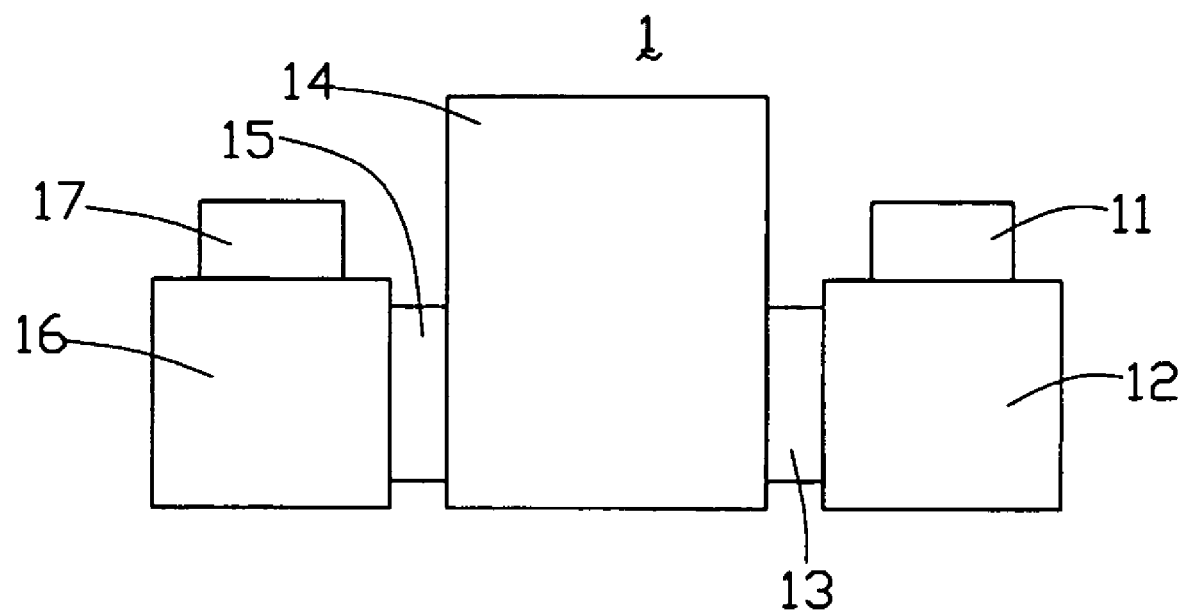
FIG. 6 is a schematic, top plan view of a conventional LCD panel repair system, which incorporates a turning device.

Thirdly, referring to FIG. 5, with the LCD panel 71 held by the panel turning unit 30, the lift unit 40 raises the panel turning unit 30 again. Then the panel turning unit 30 is turned over, so that the LCD panel 72 faces the repair unit 80. The lift unit 40 is lowered again, and the LCD panel 72 is placed on the repair unit 80.

Finally, while the LCD panel 72 is undergoing repair on the repair unit 80, the shifting unit 50 moves the lift unit 40, the panel turning unit 30 and the LCD panel 71 far away from the repair unit 80, and the LCD panel 71 is unloaded from the panel turning unit 30. Thus, one cycle of handling the LCD panel 71 is completed.

In addition, the rotation of the motors 31, 41 and 51 can be controlled by a control unit (not shown). The control unit can control the turning angle of the panel turning unit 30, the lifting height of the lift unit 40, and the linear movement distance of the shifting unit 50.

As described above, because the panel turning unit 30 has two opposite faces, the LCD panel turning device 100 can load and unload the LCD panels 71, 72 by means of the single panel turning unit 30. When the LCD panel turning device 100 is used in an LCD panel repair system, placing and removing of each LCD panel 71, 72 on and from the repair unit 80 is accomplished by means of only the single panel turning unit 30. Thus the space taken up by the LCD panel turning device 100 is less than that of comparable prior art.

In alternative embodiments, the positioning pins 36 can be T-shaped. The T-shaped positioning pins can restrain the movement of a loaded LCD panel 71, 72 in vertical directions. To enhance the precision of movement of each part of the LCD panel turning device 100, the screws 42 and 52 can be replaced by ball screws.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An LCD (liquid crystal display) panel turning device, comprising:
   a panel turning unit with two opposite panel holding faces, wherein the panel turning unit can turn about a central axis thereof;
   a lift unit connecting with the panel turning unit, wherein the lift unit can raise or lower the panel turning unit; and
   a shifting unit connecting with the lift unit, wherein the shifting unit can move the lift unit and the panel turning unit back and forth along a path in unison.

2. The LCD panel turning device as recited in claim 1, wherein the panel turning unit comprises an alignment part and a first driving motor, and the first motor can drive the alignment part to turn about the central axis.

3. The LCD panel turning device as recited in claim 1, wherein the lift unit comprises a second driving motor, and the second motor can drive the lift unit to raise or lower the panel turning unit.

4. The LCD panel turning device as recited in claim 3, wherein the lift unit further comprises a first worm screw connecting with the second driving motor, and the shifting unit defines a first screw hole receiving the first worm screw.

5. The LCD panel turning device as recited in claim 4, wherein the lift unit further comprises two first guide rods, and the shifting unit further defines two first guide holes receiving the first guide rods.

6. The LCD panel turning device as recited in claim 1, wherein the shifting unit comprises a third driving motor, and the third motor can drive the shifting unit back and forth along the path.

7. The LCD panel turning device as recited in claim 6, wherein the shifting unit further comprises a second worm screw connecting with the third driving motor, and the shifting unit defines a second screw hole receiving the second worm screw.

8. The LCD panel turning device as recited in claim 7, wherein the shifting unit further comprises two second guide rods, and the shifting unit further defines two second guide holes receiving the second guide rods.

9. The LCD panel turning device as recited in claim 1, further comprising a base, wherein the shifting unit is set on the base.

10. The LCD panel turning device as recited in claim 7, further comprising a control unit, wherein the control unit can control the turning angle of the panel turning unit, the lifting height of the lift unit, and the movement distance of the shifting unit.

11. The LCD panel turning device as recited in claim 1, wherein each panel holding face of the turning unit has a suction cup.

12. The LCD panel turning device as recited in claim 11, wherein each panel holding face of the turning unit has a plurality of positioning pins.

13. The LCD panel turning device as recited in claim 12, wherein the positioning pins are T-shaped.

14. An LCD (liquid crystal display) panel rework station assembly, comprising:
- a panel turning unit with a device holding a panel and defining a pivot axis thereof along a front-to-back direction;
- a lift unit connecting with the panel turning unit, wherein the lift unit can raise or lower the panel turning unit along a vertical direction perpendicular to said front-to-back direction; and
- a shifting unit connecting with the lift unit, wherein the shifting unit can move the lift unit and the panel turning unit back and forth along said front-to-back direction.

15. The assembly as claimed in claim 14, wherein a repair unit is located at a rear end of said shift unit.

16. An LCD (liquid crystal display) panel rework station assembly comprising: a repair unit at an end of a rework turning device assembly wherein said turning device assembly including a panel turning unit adapted to holding a panel thereon and to be moveably seated upon the rework turning device and defining thereof a pivot axis for rotation of the panel, and a position variation device connected to said panel turning device and being capable of adjusting both vertical and horizontal positions of the panel turning unit.

17. The assembly as claimed in claim 16, wherein adjustment of both said vertical and horizontal positions of the panel turning unit is performed by two separate screws perpendicular to each other.

* * * * *